Nov. 26, 1935.                M. LOEB                2,022,118
              MEANS FOR SEPARATING SOLIDS FROM LIQUIDS
                        Filed July 11, 1934
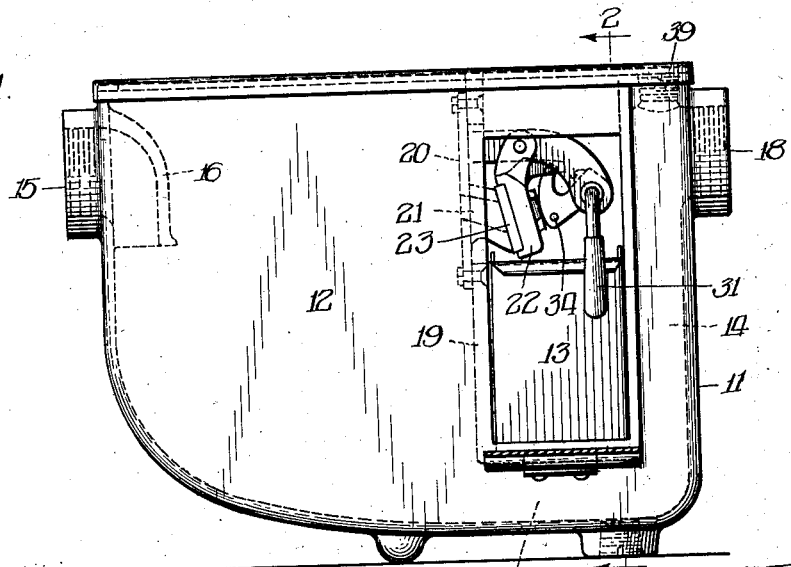
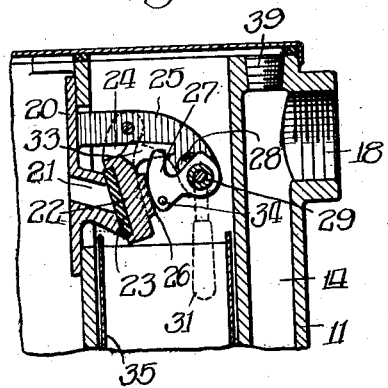
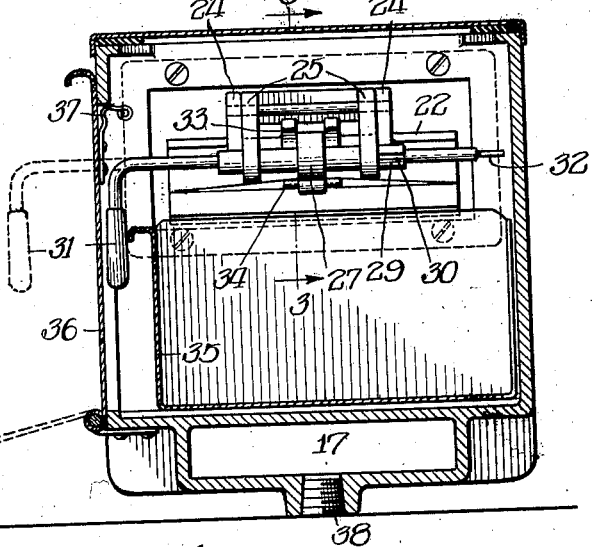
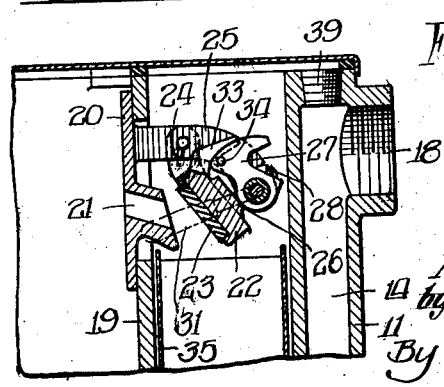
Inventor:
Maurice Loeb, deceased
by Frieda Loeb, Executrix.
By Cromwell, Greist + Warden
                       attys.

Patented Nov. 26, 1935

2,022,118

UNITED STATES PATENT OFFICE 2,022,118

MEANS FOR SEPARATING SOLIDS FROM LIQUIDS

Maurice Loeb, deceased, late of Chicago, Ill., by Frieda Loeb, executrix, Chicago, Ill.

Application July 11, 1934, Serial No. 734,702

3 Claims. (Cl. 210—56)

The present invention relates to devices for the separation of grease and foreign matter from liquids and more particularly to devices for use in the waste lines of plumbing systems which are connected to sinks and other plumbing fixtures into which grease or oil-bearing waste water is discharged.

The waste portion of the plumbing system in most household, apartment, hotel and restaurant installations is subject to frequent stoppage due to the presence of large quantities of grease and other matter insoluble in water. Grease is probably the worst offender so far as stoppage in waste systems is concerned. Particularly is this true of the drain lines leading from kitchen sinks or sinks in restaurants and the like where the liquid to be drained off into the sewage system contains relatively large amounts of grease, coffee grounds and the like.

The primary object of the present invention is the provision of a separating device which may be mounted immediately below the household sink and thus at the source separate the solids and grease from the liquid discharged into the sink prior to the time that it enters the waste pipes leading to the sewer.

A further object of the invention is the provision of a device of the character described which is easily and conveniently cleaned and cared for.

In the accompanying drawing a preferred embodiment of the invention is shown. It is to be understood, however, that this disclosure is for illustrative purposes only and is not to be construed as unnecessarily limiting the scope of the appended claims.

Referring to the drawing:

Fig. 1 is a section in side elevation with the door of the grease receptacle portion of the device open;

Fig. 2 is a sectional view on the line 2—2 of Fig. 1;

Fig. 3 is a sectional view on the line 3—3 of Fig. 2; and

Fig. 4 is a view in cross section showing the gate between the separation chamber and the grease receptacle in open position.

In its general composition, the device comprises an outer casing, referred to by the numeral 11, which is divided into a separation chamber indicated by the reference numeral 12, a grease receptacle chamber indicated by the reference numeral 13 and an outlet portion indicated by the reference numeral 14.

The casing 11 is provided with an inlet opening 15, which opening is provided with an inwardly and downwardly extending baffle 16 located in the separation chamber 12. The purpose of the inwardly and downwardly extending baffle 16 is to direct the flow of the incoming liquid toward the bottom of the separation chamber 12. As appears in Fig. 2, the separation chamber 12 narrows toward the outlet end to provide a channel 17 which passes beneath the grease receptacle chamber 13. Connected to the channel 17 is a channel 14 which extends upwardly to the outlet 18. Due to the fact that the channel 17 is narrow and in direct line with the downward flow from the intake baffle member 16 there is an increased rate of flow through the channel member 17.

Mounted on the partition 19 which separates the separation chamber 12 from the grease receptacle 13 is a plate 20 which is provided with an elongated opening 21 that is bounded by parallel edges that extend into the grease receptacle chamber 13. The plate 20 is mounted so that in normal operation of the device the level of the water in the chamber 12 will be slightly above the bottom edge of the opening 21. To assure this height of the liquid level in the separation chamber the exhaust opening 18 is positioned so that the bottom of that opening is slightly above the bottom edge of the opening 21.

Closing off the opening 21 from the separation chamber 12 is a gate member 22 which is shown in detail in Figs. 2, 3 and 4. The gate member 22 consists of an elongated member which is wider than the opening 21 and is provided with a gasket 23 which may be of suitable material to withstand the action of grease and oil. The gate member 22 is provided with arm members 24 which extend upwardly and are pivotally mounted to inwardly projecting brackets 25, the latter being secured to the plate 20. The back face of the gate member 22 is provided with a projecting surface 26 which engages with a cam-shaped member 27. The cam-shaped member 27 is fixedly secured by means of a set screw 28 to a sleeve member 29. The sleeve member 29 is pivotally mounted at the ends of the brackets 25 and is provided with slots 30 at the inner end thereof. Slidably mounted within the sleeve member 29 is a handle member 31, the inner end of which handle member is flattened to form a key-shaped portion 32 which is adapted to engage with the edges of the slots 30 when the handle member is moved outwardly, as shown in dotted lines in Fig. 2.

As shown in detail in Fig. 4, in order that the handle member will not only actuate the cam 27 to close the gate 22 but also to raise the gate, finger members 33 are provided at the upper edge of the gate and a pin 34 is provided extending through the cam member to engage said finger members when the cam member is moved in an upward direction.

Located in the grease separating chamber 13 immediately below the opening 21 is a grease receptacle 35. A door 36 hinged at its bottom portion and provided with a catch 37 at the top closes off the grease receptacle portion and, as is apparent from Fig. 2, upon opening of the door the handle mmeber 31 may be moved outwardly and, likewise, the grease receptacle 35 may be removed from the device. A clean-out plug 38 is provided at the bottom of the device.

Having reference to the operation of the device, it is apparent that the intake 15 may be connected directly to the waste pipe of the sink and since the device may be constructed relatively light and of rather small dimensions it may be suspended immediately below the sink or supported from the wall or floor. The waste waters discharged from the sink are thus fed directly into the separation chamber. The baffle plate 16 directs their flow downwardly toward the bottom of the chamber, thus providing a quiescent pool within the chamber which gives the opportunity for the grease and the other particles lighter than water to rise to the surface and accumulate upon the surface in the form of scum and grease. The solid matter and particles heavier than water will quickly settle to the bottom and due to the fact that the exhaust from the separation chamber is relatively narrow the rate of flow of water through the exhaust portion of the device is sufficiently rapid to wash these particles on up through and into the sewage system.

The discharge of such solid particles into the sewage system does not tend to clog the sewer unless there is grease present but since the grease has been removed they will pass on through without any detrimental effects. The clean-out plug 38, however, is provided so that in the event any heavy matter or sediment should accumulate it may readily be removed merely by removal of this plug and draining of the separation chamber.

The opening 39 is provided, as in some installations it is desirable to connect a pipe from this opening to the vent of the sewage system, since in some systems there may be created a syphon which will syphon the water out of the separation chamber and thus defeat the purpose of the device, as will later appear. The use of such a vent, however, is not generally necessary and, therefore, in the drawing of the device it is shown with a plug in this opening.

It will be apparent from the foregoing description that as the grease and lighter than water matter accumulates at the top of the separation chamber it will become necessary, at intervals, to drain the same from the chamber. This is accomplished by opening the door 36, pulling out the handle member 31 so that the inner end thereof engages into the slots 30, rotating the handle member to raise the cam member 27 upwardly and thus cause the pin 34 to engage the fingers 33 and raise the gate 22. When the gate 22 opens the grease will flow out of the separation chamber and into the grease receptacle 35.

In view of the fact that the grease and other matter which accumulates at the top of the separation cahmber is lighter than water it will rise above the opening 21 although the bottom edge of the opening 21 is just slightly below the water level in the device. It is apparent that the height of the grease in the separation chamber directly above the bottom edge of the opening 21 cannot exceed in weight the weight of the water which would normally be above the edge of the opening if no grease were present. This is accomplished, of course, by regulating the height of the exhaust opening 18. The exhaust opening 18 is arranged so that the amount of grease that can accumulate in the top of the separation chamber will not exceed the capacity of the grease receptacle 35. By this arrangement the user of the device is assured that when he opens the gate there will be no overflow of the grease receptacle 35 but the same will only be filled to its capacity. Thus the emptying of the grease from the device is not a messy or dirty job but is very easily and conveniently acomplished. The discharged grease, of course, may be thrown away or, in the case of some installations, saved for its commercial value.

In order to close the gate, and thus shut off the flow of grease or water into the receptacle 35, the handle 31 is turned to cause the cam 27 to bear against the gate and forcibly contact it with the edges bounding the opening 21.

The device has been found particularly useful in household systems as it is sanitary and effective in removing the grease and matters which ordinarily clog the sewage system. Thus is reduces the expense of maintaining the sewage system as well as the inconvenience of having frequent stoppage in the waste pipes, as is often the case in households where greasy dish water and the like is discharged into the sink. It is particularly valuable in installations where the fall of the discharge pipe from the sink is not sufficiently great to give the discharged water a rapid rate of flow as such installations are very quickly stopped up from grease-bearing water.

It is claimed:

1. A device for separating matter from liquids comprising a separation chamber having inlet and outlet openings therein, a grease receptacle chamber adjacent said separation chamber, a grease receptacle in the last mentioned chamber, means for conducting grease from said separation chamber to said receptacle chamber, said means being positioned below the normal liquid level of said separation chamber a distance such that the volume of liquids and grease which may accumulate at the top of said separation chamber will not exceed the capacity of said grease receptacle and means for stopping the flow from said separation chamber to said grease receptacle chamber.

2. A device for separating matter from liquids comprising a casing having an inlet opening at one end thereof, a baffle plate for directing the flow of liquid from said opening downwardly, a partition extending across said casing to form a separation chamber, a grease receptacle positioned between said partition and the outlet end of said housing, a channel portion beneath said grease receptacle and connecting with said separation chamber, said channel portion extending upwardly in said housing to form a discharge outlet and means for conducting grease from said separation chamber to said grease receptacle.

3. A device for separating matter from liquids comprising a casing having an inlet opening at one end thereof and an outlet opening at the other end thereof, a partition extending across said casing to form a separation chamber and a grease receptacle chamber, a grease receptacle positioned in said grease receptacle chamber, means in said partition for conducting grease in said separation chamber to said grease receptacle chamber, a gate member for shutting off the flow of grease, means for actuating said gate member, a handle member slidably mounted in said gate actuating means and adapted to interlock therewith in certain positions so that said handle member may be utilized to operate said gate actuating means.

FRIEDA LOEB,
*Executrix of the Estate of Maurice Loeb, Deceased.*